(12) United States Patent
Jost et al.

(10) Patent No.: US 8,989,006 B2
(45) Date of Patent: Mar. 24, 2015

(54) METHOD AND APPARATUS FOR GLITCHLESS FAILOVER TO REDUNDANT STREAM

(75) Inventors: Arthur P. Jost, Mount Laurel, NJ (US); Robert E. Mack, Collegeville, PA (US); Lawrence D. Vince, Lansdale, PA (US)

(73) Assignee: General Instrument Corporation, Horsham, PA (US)

( * ) Notice: Subject to any disclaimer, the term of this patent is extended or adjusted under 35 U.S.C. 154(b) by 1868 days.

(21) Appl. No.: 11/321,404

(22) Filed: Dec. 29, 2005

(65) Prior Publication Data

US 2007/0153679 A1    Jul. 5, 2007

(51) Int. Cl.
  *H04L 12/26*    (2006.01)
  *H04N 21/2389*    (2011.01)
  *H04N 21/2343*    (2011.01)
  *H04N 21/63*    (2011.01)
  *H04N 21/2381*    (2011.01)
  *H04N 21/242*    (2011.01)
  *H04N 21/643*    (2011.01)

(52) U.S. Cl.
  CPC ......... *H04N 21/242* (2013.01); *H04N 21/2389* (2013.01); *H04N 21/23439* (2013.01); *H04N 21/631* (2013.01); *H04N 21/2381* (2013.01); *H04N 21/64322* (2013.01)
  USPC ......................................................... 370/235

(58) Field of Classification Search
  None
  See application file for complete search history.

(56) References Cited

U.S. PATENT DOCUMENTS

| 6,073,251 | A  * | 6/2000 | Jewett et al. ...................... 714/7 |
| 6,839,865 | B2 * | 1/2005 | Gould et al. ...................... 714/6 |
| 6,977,885 | B1 | 12/2005 | Watanuki |
| 7,443,791 | B2 * | 10/2008 | Barrett et al. .................. 370/230 |
| 7,630,293 | B2 * | 12/2009 | Moon ............................ 370/216 |
| 2002/0075873 | A1 | 6/2002 | Lindhorst-Ko et al. |
| 2002/0114332 | A1 | 8/2002 | Apostolopoulos |
| 2002/0116715 | A1 | 8/2002 | Apostolopoulos |
| 2004/0073929 | A1 * | 4/2004 | Morello .......................... 725/63 |
| 2004/0218633 | A1 * | 11/2004 | Burzynski ..................... 370/474 |
| 2006/0146815 | A1 * | 7/2006 | Tse ............................... 370/389 |
| 2006/0209709 | A1 * | 9/2006 | Kovacevic ..................... 370/252 |
| 2006/0256768 | A1 * | 11/2006 | Chan ............................. 370/351 |
| 2007/0006253 | A1 * | 1/2007 | Pinder et al. ................... 725/31 |
| 2008/0013548 | A1 * | 1/2008 | Glaise et al. ............. 370/395.71 |
| 2008/0037658 | A1 * | 2/2008 | Price et al. ............... 375/240.26 |
| 2008/0130658 | A1 * | 6/2008 | Chakareski et al. ..... 370/395.42 |

FOREIGN PATENT DOCUMENTS

EP    0963082    12/1999

OTHER PUBLICATIONS

European Search Report for EP06026719. Date issued: Jul. 5, 2007.
Office Action, Canadian App. No. 2572361, Jun. 3, 2009.

(Continued)

*Primary Examiner* — Rhonda Murphy
(74) *Attorney, Agent, or Firm* — Stewart M. Wiener (57) ABSTRACT

A method and apparatus for providing seamless failover to a redundant stream at an edge device is disclosed. A plurality of identical streams are received via a plurality of paths at a plurality of synchronization buffers. Each synchronization buffer receives one of the plurality of identical streams from a corresponding path of the plurality of paths. The plurality of streams are synchronized. A composite stream is generated from the plurality of identical streams according to a packet selection process.

18 Claims, 7 Drawing Sheets

(56) References Cited

OTHER PUBLICATIONS

EPC Exam Report, RE: Application No. 06026719.2-1908; dated Dec. 5, 2013.

A. Iselt, "A New Synchronization Algorithm for Hitless Protection Switching in ATM Networks", Performance, Computing and Communications Conference, IEEE Int'l, Feb. 10-12, 1999, pp. 370-376.

* cited by examiner

METHOD AND APPARATUS FOR GLITCHLESS FAILOVER TO REDUNDANT STREAM

BACKGROUND OF THE INVENTION

1. Field of the Invention

The present invention relates to internet protocol based video distribution systems. In particular, this invention relates to a method and apparatus for glitchless failover to a redundant stream.

2. Description of the Related Art

Internet Protocol (IP) based video distribution systems are becoming commonplace in cable network infrastructures. Multiple System Operators (MSOs) currently distribute primary and redundant feeds to edge devices over IP networks. Failover between primary and redundant video streams in current systems introduce brief interruptions in the video signal.

Therefore, there is a need in the art for a method and apparatus that is capable of switching to a redundant stream without a glitch when a primary stream is interrupted or has errors introduced.

SUMMARY OF THE INVENTION

In one embodiment, the present invention generally discloses a method and apparatus for providing seamless failover to a redundant stream at an edge device. A plurality of identical streams are received via a plurality of paths at a plurality of synchronization buffers. Each synchronization buffer receives one of the plurality of identical streams from a corresponding path of the plurality of paths. The plurality of streams are synchronized. A composite stream is generated from the plurality of identical streams according to a packet selection process.

DETAILED DESCRIPTION

An edge device with the capability to execute a seamless failover between two stream sources (e.g., video stream sources) is disclosed. In one embodiment, one video stream source acts as a primary and another video stream source acts as a backup. Seamless failover means that the edge device would switch from the primary source to the backup without losing any video packets such that the downstream decoder would not display any glitch or interruption in video during the failover. This can be done assuming the primary and redundant video sources are identical in content and differ only in delay and jitter induced by the IP transport network. Identical video feeds are generated from a common source that is distributed across multiple network paths in order to protect against network failures. Any processing of the video content resulting in differences between the primary and redundant video feeds makes this scheme unworkable, so transcoding, encryption, etc. is precluded between the video source and the edge device. Described is an approach to receiving the redundant signals that may include dropped packets, corrupted packets, stream interruptions, etc., and constructing an exact replica of the original source stream for output. An approach for achieving and maintaining synchronization of the redundant streams in the edge device is described. An approach for continuously selecting packets from either source rather than treating one source as primary and the other as secondary is also described.

Figure 1:
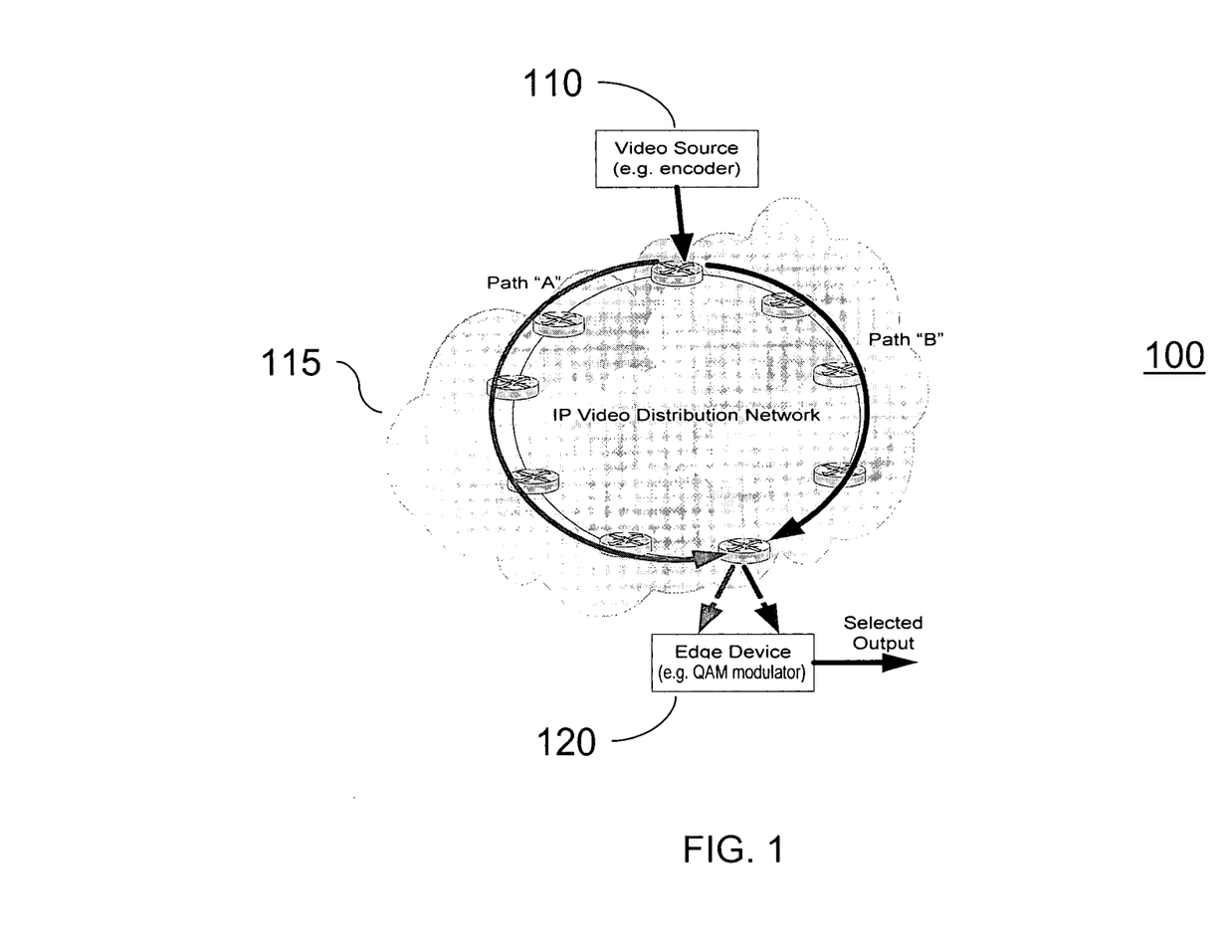
FIG. 1 illustrates an internet protocol based video distribution system according to one embodiment of the present invention.

FIG. 1 illustrates an IP-based video distribution system 100 according to one embodiment of the present invention. A video source 110 (e.g., encoder) sends video via a plurality of paths. In this embodiment, video is sent through IP video distribution network 115 via Path "A" and Path "B". Edge device 120 receives video via paths "A" and "B" and uses the received video to construct a composite video stream. Although FIG. 1 illustrates only two paths, the present invention may receive identical streams from more than two separate paths. In order to simplify discussion, only two paths will be discussed.

Figure 2:
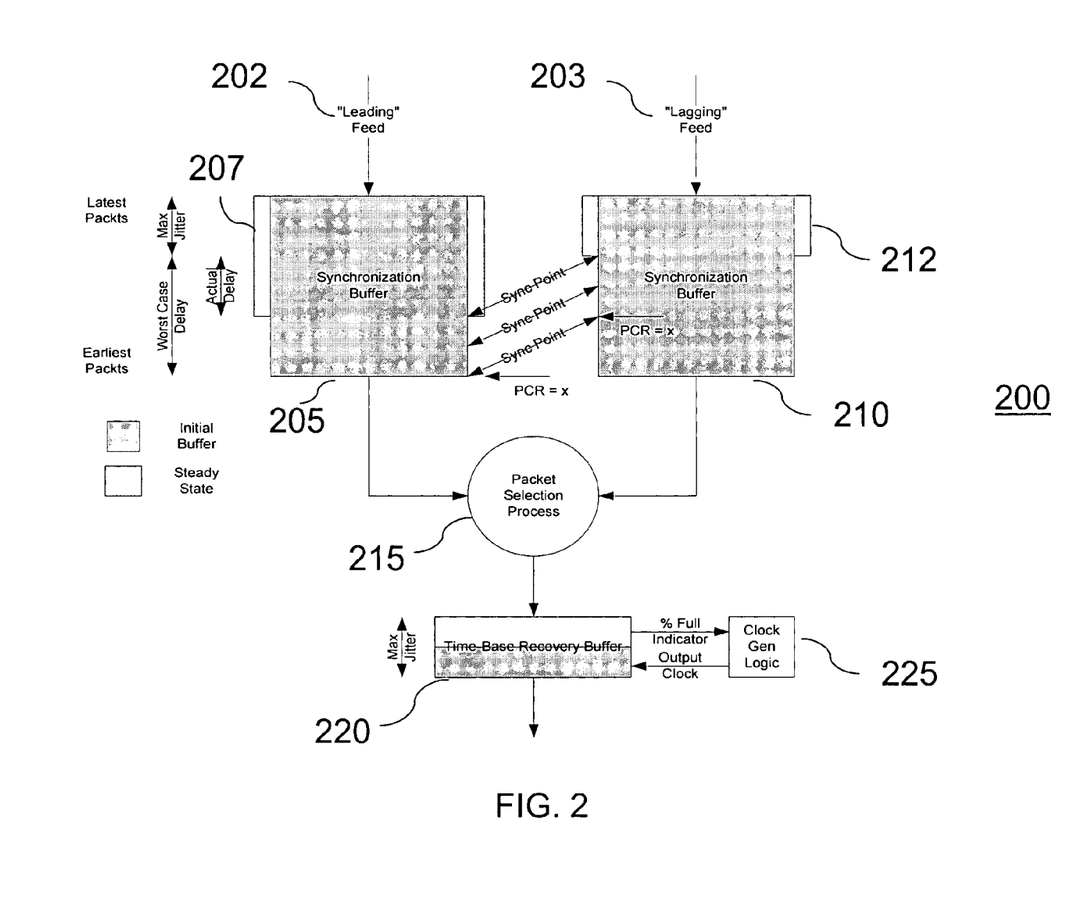
FIG. 2 illustrates a diagram of an apparatus for achieving seamless failover among redundant streams according to one embodiment of the present invention.

FIG. 2 illustrates a diagram of an apparatus 200 for achieving seamless failover among redundant streams according to one embodiment of the present invention. Apparatus 200 may be implemented in edge device 120. In one embodiment, two synchronization buffers 205, 210 are used for the redundant feeds, i.e. "Leading" feed 202 and "Lagging" feed 203. The minimum buffer size is dependent on the delay between the two feeds and worst case jitter imposed by the network. The "sync point" arrows indicate the relative delay between the redundant streams. In this embodiment, feed 202 is "leading" since a given packet arrives at the edge device from this stream first (i.e. the packet with program clock reference (PCR)='x' is received first from this stream). Buffers 205, 210 indicate the initial buffer allocation during stream synchronization. Reduced buffer requirements 207, 212 are indicated in buffers 205, 210 after synchronization is achieved and relative delay is determined. In one embodiment, a correlation algorithm may be used instead of the PCR. A packet selector, i.e., packet selection process 215 follows the synchronization buffers and selects packets from either buffer depending on a packet selection algorithm.

After a single, composite stream is created from the packet selection process, time base recovery (TBR) is performed. Any of the TBR methods used by existing edge devices may be used. Typically, TBR requires a TBR buffer large enough to accommodate the maximum expected network jitter. Although a separate buffer is shown in FIG. 2, from a functional viewpoint, the same physical buffers used for synchronization, i.e. buffers 205, 210 may be used for time-base recovery. In addition, a single buffer having memory allocations for each feed may be utilized instead of buffers 205, 210.

In one embodiment, TBR buffer 220 receives the composite stream from packet selector 215. Regardless of whether TBR buffer 220 is physically separate from or shared with the synchronization buffers, its basic operation is the same. If a constant bit rate (CBR) stream is assumed, the operation is simpler, but the same principles can be applied to variable bit rate (VBR) streams as well. In either case, the idea is to keep TBR buffer 220, on average, as close to the half-full point as possible. Assuming a CBR stream, this is done by initially estimating the bit-rate of the stream, setting output clock 225 to match the estimated rate, filling buffer 220 to the half-full mark, and then enabling output clock 225. As the stream is processed, the fullness of buffer 220 is monitored. If buffer 220 starts to fill beyond half-full the output clock rate is marginally increased. If buffer 220 starts to empty below half-full the output clock rate is marginally reduced. The changes to the output clock rate have to be managed in a way that does not violate the timing requirements of MPEG standard. The result is a smoothing operation that uses buffer 220 to absorb any network induced jitter while forcing the output clock rate to track the clock rate that was used at the source of the stream.

In order to process VBR streams, a characteristic of the encoding standard may be exploited. MPEG streams are normally held at a constant bit rate between PCR timestamps. Another way of stating this is to say that a PCR timestamp is inserted whenever the bit rate of the stream changes. This means that the bit rate of the stream needs to be re-estimated at each occurrence of a PCR in the stream, and the output clock rate is changed to the re-estimated value at the PCR boundary. In this case rather than change the actual bit rate of output clock 225 based on TBR buffer fullness, a bias value of output clock 225 is adjusted based on buffer fullness. This bias is then applied to the estimated stream bit rate each time it is re-calculated. In this way TBR buffer 220 will be managed so that it remains, on average, at or near the half-full mark.

Figure 3:
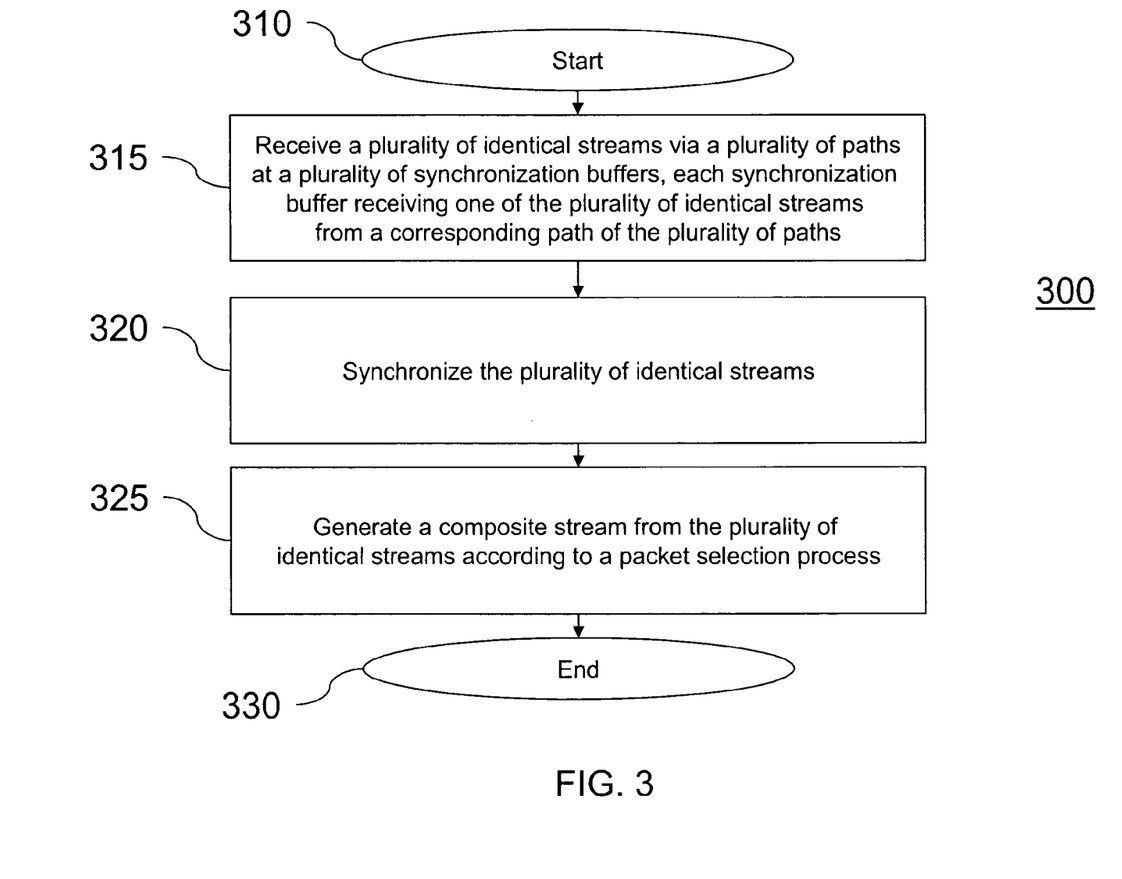
FIG. 3 illustrates a block diagram of a method according to one embodiment of the present invention.

FIG. 3 illustrates a diagram of a method 300 according to one embodiment of the present invention. Method 300 begins at step 310 and proceeds to step 315.

At step 315 a plurality of identical streams is received via a plurality of paths at a plurality of synchronization buffers. Each synchronization buffer receives one of the plurality of identical streams from a corresponding path of the plurality of paths. For example, as described above with respect to FIG. 2, synchronization buffer 205 receives a "leading" stream on "leading" feed 202 via a first path and synchronization buffer 210 receives a "lagging" stream on "lagging" feed 203 via a second path.

At step 320, the plurality of identical streams are synchronized. In one embodiment, stream synchronization is based on moving picture experts group (MPEG) PCR time stamps. In order to achieve initial synchronization the edge device starts buffering both streams and searches for matching PCR packets. Once the PCR match is found, stream synchronization is achieved by noting the packet offset between the two streams.

Figure 4A:
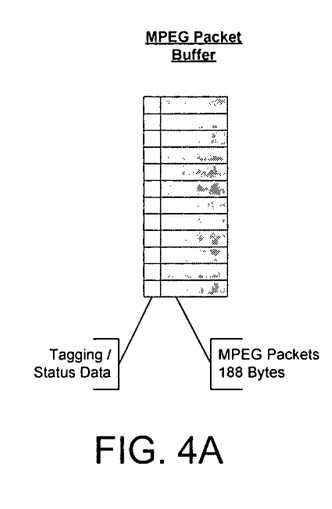
FIG. 4A illustrates a stream buffering approach according to one embodiment of the present invention.

FIG. 4A describes a stream buffering approach according to one embodiment of the present invention. The user datagram protocol/internet protocol (UDP/IP) layer and any streaming protocol layers are stripped. The resulting MPEG packets are buffered for packet-by-packet comparison. In this case the MPEG packets in each stream do not have to be packaged identically in the UDP/IP packets.

Figure 4B:
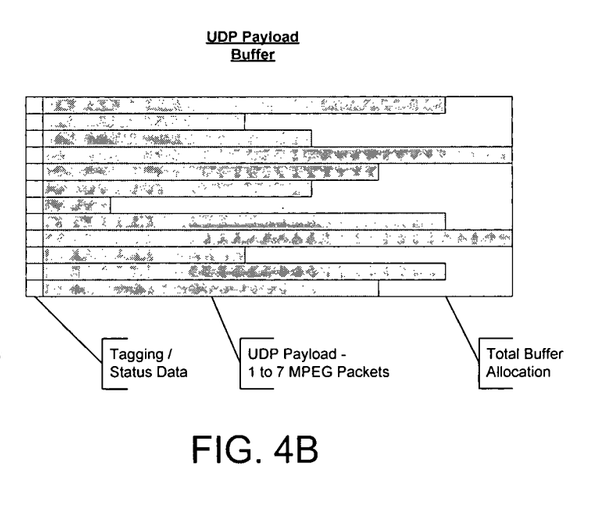
FIG. 4B illustrates a stream buffering approach according to one embodiment of the present invention.

FIG. 4B describes a stream buffering approach according to one embodiment of the present invention. The UDP/IP layer is stripped, but the entire content of the UDP/IP packet is buffered as a single entity for comparison. This includes any streaming protocol contributions, such as real time protocol (RTP). In this case the MPEG packets in each stream have to be packaged identically. "Packaged identically" means that if a series of datagrams for one feed carries for example, packets [1, 2, 3], [4, 5], [6, 7, 8, 9] then a datagram for the other feed must also carry packets [1, 2, 3], [4, 5], [6, 7, 8, 9] where bracketed material, e.g. [1, 2, 3], indicates a single, complete UDP/IP datagram.

Synchronization will be maintained as long as the there are no errors, or limited errors, on either of the redundant streams. The edge device 120 verifies continued synchronization by continuously comparing the packets received from the two streams. The comparison process varies slightly depending on which buffering approach is used.

For the case where MPEG packets are buffered individually, as illustrated in FIG. 4A, the packets in the two buffers are compared as they are prepared for output. If identical, the packet data is used for output. If the packets are not identical, a packet selection process is used to select a packet for output. Depending on the level of robustness desired it is not necessary to compare all 188 bytes of each packet to be output. An 8- or 16-byte comparison at the start of the packet may be sufficient to determine consistency. Eight bytes would include the MPEG header and a portion of the payload or a portion of the adaptation layer (if present) including two bytes of the PCR clock base (if present).

The comparison is similar for the case where UDP/IP payloads are buffered as separate entities, as illustrated in FIG. 4B. The difference will be how much data needs to be compared for each UDP/IP payload and where the comparison data should be taken from—beginning vs. middle or other location within the payload.

Corrupted packets need to be detected before the packets are due to be transmitted on the output. Rather than run a comparison on every MPEG packet in the buffer the synchronization algorithm should look ahead in the buffers at fixed increments. The edge device can look ahead from the current sync point by a fixed offset in both buffers and compare the MPEG packet or UDP/IP payload. If the two streams match, that packet/payload location in the buffers defines a new sync point; i.e. the buffers are in sync until at least that point in the buffers. This does not necessarily mean that there will not be any corrupted packets/payload prior to the new sync point. The packet selection process described below addresses packet/payload corruption that does not result in packet loss or packet duplication.

The look-ahead process continues until a mis-match is detected. At that point an algorithm is run to determine exactly where in the buffers synchronization is lost and where it can be reestablished. The buffers are then marked to indicate the synchronized and unsynchronized sections and demarcation points. It may be desirable to always place the demarcation points at PCR packets from one of the video streams. This would result in unsynchronized sections that are longer than necessary but may simplify the process of maintaining synchronization. However, since PCRs are only required every 100 mS, MPEG large buffers may be required to ensure the availability of multiple PCR packets in the buffers. The packet selection process must then decide which buffer to use, or what combination of data from the 2 buffers to use, during the period of lost synchronization.

Returning to FIG. 3, in step 325, a composite stream is generated from the plurality of identical streams according to a packet selection process. Once buffer synchronization is achieved, the packet selection process recreates the original stream content (or as close to the original as possible) and places packets in the TBR buffer. There are two general cases for packet selection: from synchronized sections of the buffers, and from unsynchronized sections of the buffers.

Figure 5:
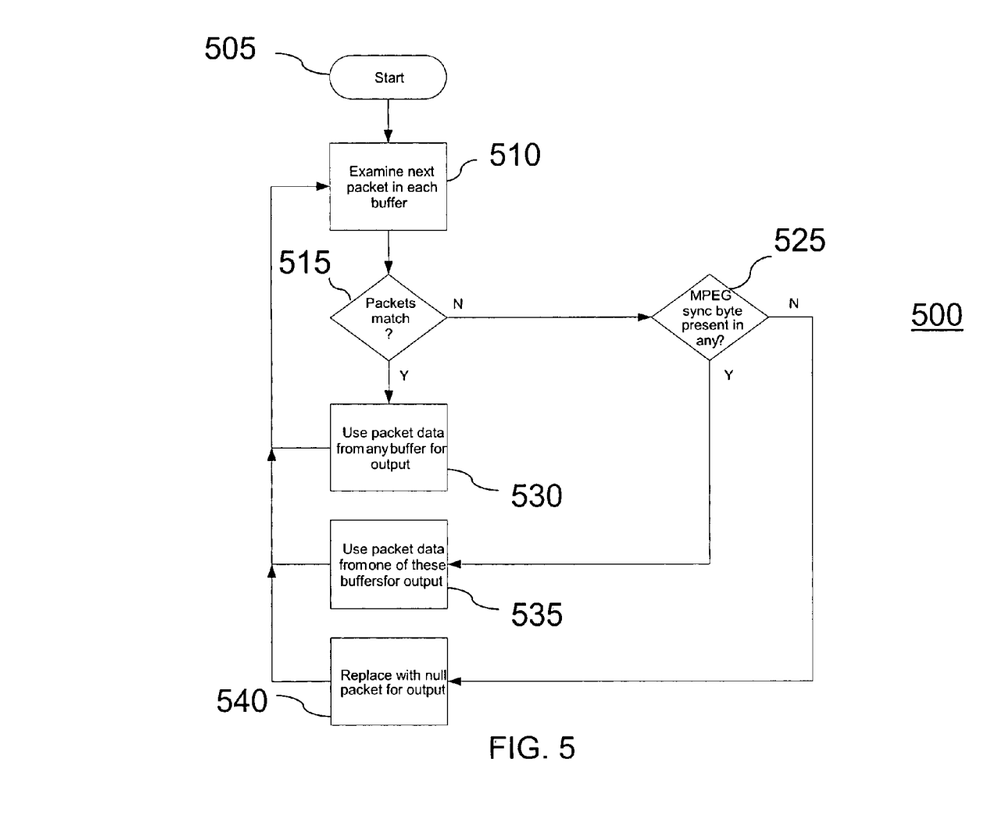
FIG. 5 illustrates a diagram of a packet selection process according to one embodiment of the present invention.

When the buffers are synchronized, the packet selection process is straightforward. Data ready to be output from the sync point in the two buffers is compared. If the data matches, data from one of the buffers (e.g., buffer 205) is used for output. If the data does not match, a determination of which buffer's data to use must be made. There are many possible ways to determine which buffer has the most reliable data. FIG. 5 illustrates a diagram of a packet selection process, i.e., packet selection method 500 according to one embodiment of the present invention. Packet selection method 500 begins at step 505 and proceeds to step 510. At step 510, the next packet in each buffer is examined.

At step 515, a determination is made as to whether or not the packets in each buffer match. If the packets in each buffer match, packet data from any buffer may be used for output as illustrated in step 530. If the packets in each buffer do not match, the method 500 proceeds to step 525.

At step 525, a determination is made as to whether or not an MPEG sync byte is present in any of the buffers. If there is an MPEG sync byte present in any of the buffers, packet data from one of those buffers is used for output as illustrated in step 535. If an MPEG sync byte is not present in any buffer, a null packet is placed in the composite stream at step 540.

Figure 6:
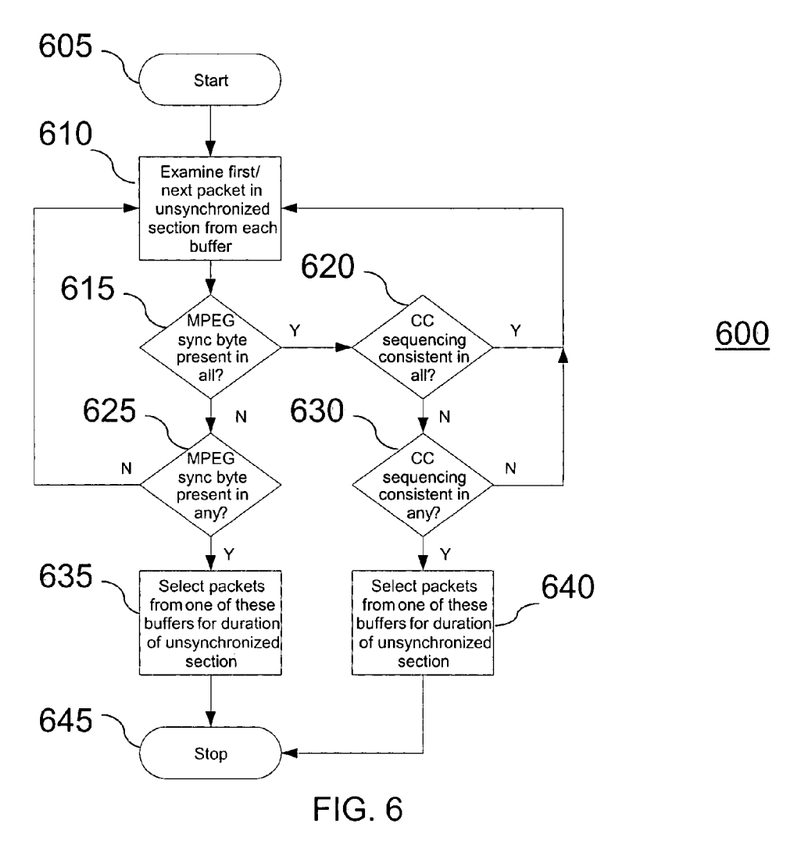
FIG. 6 illustrates a diagram of a packet selection process according to one embodiment of the present invention.

Selecting the best packet data from unsynchronized buffers requires a more robust method since the out of sync condition is caused by packets dropped or duplicated in one or both of the buffers. Again, many schemes may be created to select the best data from the two buffers. FIG. 6 illustrates a diagram of a packet selection process, i.e., packet selection method 600 according to one embodiment of the present invention. Packet selection method 600 begins at step 605 and proceeds to step 610. At step 610, the first packet in the unsynchronized section from each buffer is examined. Method 600 then proceeds to step 615.

At step 615, a determination is made as to whether or not an MPEG sync byte is present in all buffers. If there is an MPEG sync byte present in both buffers, method 600 proceeds to step 620. If an MPEG sync byte is not present in both buffers, method 600 proceeds to step 625.

At step 620, a determination is made as to whether or not continuity counter (CC) sequencing is consistent in all buffers. If CC sequencing is consistent in both buffers, method 600 returns to step 610, where the next packet in the unsynchronized section from each buffer is examined. If CC sequencing is not consistent in both buffers, method 600 proceeds to step 630. At step 630, a determination is made as to whether or not CC sequencing is consistent in any of the buffers. If CC sequencing is consistent in any of the buffers, method 600 proceeds to step 640, where packets are selected from one of the buffers where CC sequencing is consistent for the duration of the unsynchronized section. If CC sequencing is not consistent in one of the buffers, method 600 returns to step 610, where the next packet in the unsynchronized section from each buffer is examined.

At step 625 a determination is made as to whether or not an MPEG sync byte is present in any of the buffers. If there is an MPEG sync byte present in any of the buffers, method 600 proceeds to step 635 where packets are selected from one of the buffers where the MPEG sync byte is present for the duration of the unsynchronized section. If there is not an MPEG sync byte present in one of the buffers, method 600 returns to step 610, where the next packet in the unsynchronized section from each buffer is examined.

As shown in FIG. 6, when synchronization is lost an algorithm will be run to determine which stream is still valid and which stream has been corrupted, and packets from the valid stream will be used until synchronization can be re-established. Once resynchronization has been achieved, the packet selection process described with respect to FIG. 5 will once again be used.

In order to achieve resynchronization the corrupted stream must be buffered while the valid stream is used for output. While outputting packets from the valid stream the two buffers are searched for the sync point as described above with respect to initial synchronization. The only difference between initial synchronization and resynchronization is that the valid stream continues to be output during resynchronization; while during initial synchronization no packets are being passed to the output.

Figure 7:
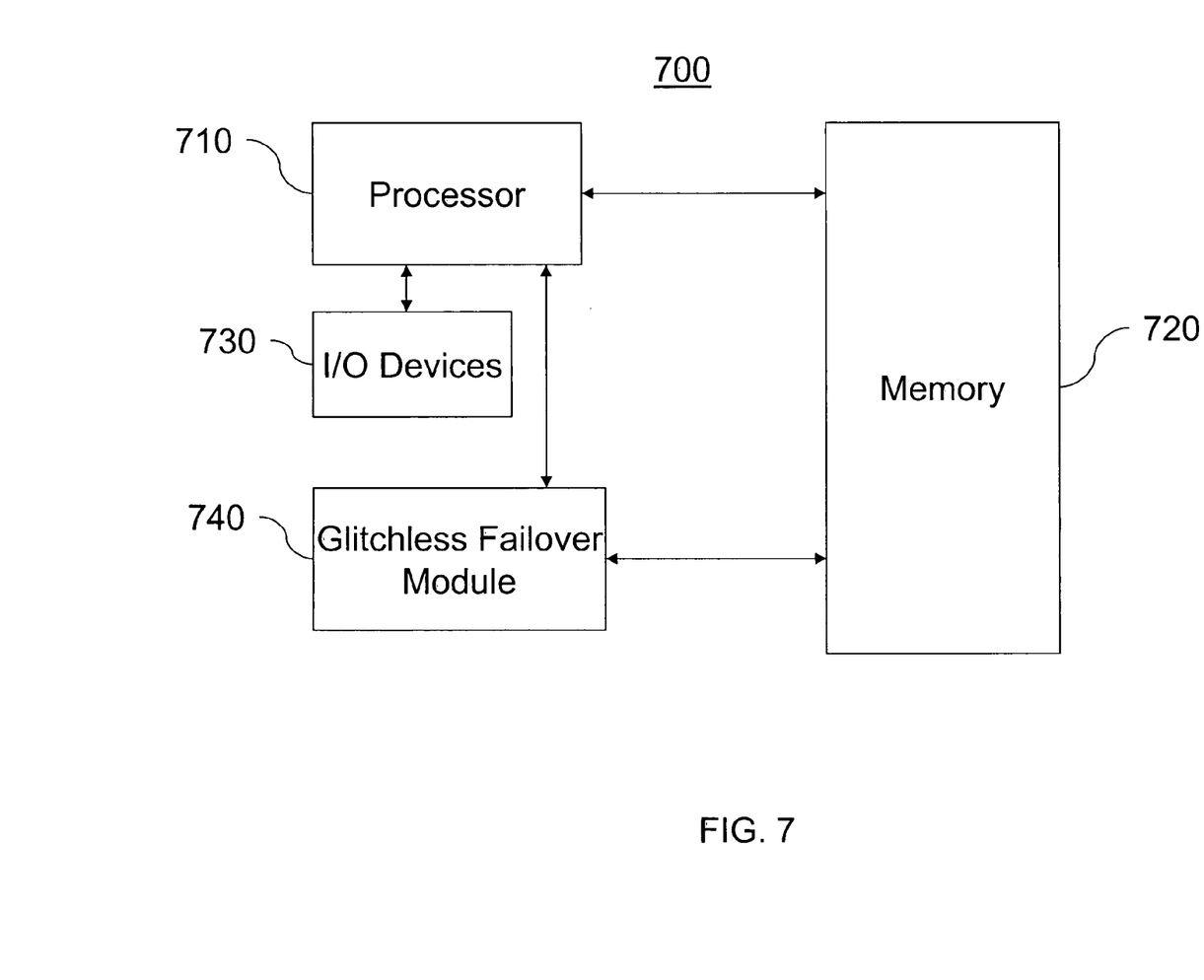
FIG. 7 illustrates an embodiment of a system according to one embodiment of the present invention.

FIG. 7 illustrates a block diagram of a transport stream processing device or system 700 of the present invention. Specifically, the system can be employed to provide seamless failover to a redundant stream at an edge device. In one embodiment, the transport stream processing device or system 700 is implemented using a general purpose computer or any other hardware equivalents.

Thus, transport stream processing device or system 700 comprises a processor (CPU) 710, a memory 720, e.g., random access memory (RAM) and/or read only memory (ROM), glitchless failover module 740, and various input/output devices 730, (e.g., storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)).

It should be understood that the glitchless failover module 740 can be implemented as one or more physical devices that are coupled to the CPU 710 through a communication channel. Alternatively, the glitchless failover module 740 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 720 of the computer. As such, the glitchless failover module 740 (including associated data structures) of the present invention can be stored on a computer readable medium, e.g., RAM memory, magnetic or optical drive or diskette and the like.

The source streams may be multi-program transport stream (MPTS) containing one or more video and/or audio services. The methods disclosed could also be applied to an MPEG program stream (no MPEG packetization) containing a single service. The services in the MPTS may be encrypted or clear when the services leave the source, as long as the services remain identical until they reach the edge device.

The MPTS may be constant bit rate or variable bit rate without impacting the disclosed failover methods. Depending on the TBR method used in the implementation of the edge device, the source MPTS may need to be overall constant bit rate (CBR) while the individual services within the MPTS may be CBR or VBR (variable bit rate); the MPTS may be VBR if the TBR method used is compatible; this is not a limitation of the failover mechanism.

While the foregoing is directed to embodiments of the present invention, other and further embodiments of the invention may be devised without departing from the basic scope thereof, and the scope thereof is determined by the claims that follow.

The invention claimed is:

1. A method for providing seamless failover to a redundant stream at an edge device, comprising:
   receiving, via a plurality of paths of an IP (Internet Protocol) network, a plurality of video streams at a plurality of synchronization buffers, each of said plurality of video streams comprising a respective stream of MPEG packets, wherein the respective streams of MPEG packets are identical streams to each other at respective video stream sources, and wherein the respective streams of MPEG packets are received in non-identical packets of an IP layer of the IP network, each synchronization buffer receiving one of said plurality of video streams from a corresponding path of said plurality of paths;

synchronizing said plurality of video streams, wherein said synchronizing comprises achieving initial synchronization by determining packet offsets among the plurality of video streams; and generating a composite stream from said plurality of video streams according to a packet selection process, wherein the packet selection process is dependent upon the synchronizing step.

2. The method of claim 1, wherein time-base recovery is performed once said composite stream is generated.

3. The method of claim 1, wherein said packet offsets are determined by searching for matching program clock reference packets in the plurality of video streams.

4. The method of claim 1, wherein said packet offsets are determined using a correlation algorithm.

5. The method of claim 1, wherein said plurality of synchronization buffers buffer the MPEG packets.

6. The method of claim 1, wherein said plurality of synchronization buffers buffer UDP/IP packets.

7. The method of claim 1, wherein said plurality of video streams comprise transport streams.

8. The method of claim 1, wherein synchronization is verified using a buffer look-ahead process.

9. The method of claim 1, wherein generating said composite stream comprises selecting packets from synchronized sections of said plurality of synchronization buffers according to said packet selection process.

10. The method of claim 1, wherein generating said composite stream comprises selecting packets from unsynchronized sections of said plurality of synchronization buffers according to said packet selection process.

11. An apparatus for providing seamless failover to a redundant stream at an edge device, comprising:

a plurality of synchronization buffers for receiving a plurality of video streams via a plurality of paths of an IP (Internet Protocol) network, each of said plurality of video streams comprising a respective stream of MPEG packets, wherein the respective streams of MPEG packets are identical streams to each other at respective video stream sources, and wherein the respective streams of MPEG packets are received in non-identical packets of an IP layer of the IP network, each synchronization buffer receiving one of said plurality of video streams from a corresponding path of said plurality of paths;

a synchronizer for synchronizing said plurality of video streams, wherein said synchronizing comprises achieving initial synchronization by determining packet offsets among the plurality of video streams; and a packet selector for generating a composite stream from said plurality of video streams according to a packet selection process, wherein the packet selection process is dependent upon the synchronizing step.

12. The apparatus of claim 11, wherein time-base recovery is performed once said composite stream is generated.

13. The apparatus of claim 11, wherein said packet offsets are determined by searching for matching program clock reference packets in the plurality of video streams.

14. The method of claim 11, wherein said packet offsets are determined using a correlation algorithm.

15. The method of claim 11, wherein said plurality of video streams comprise transport streams.

16. The method of claim 11, wherein synchronization is verified using a buffer look-ahead process.

17. The method of claim 11, wherein generating said composite stream comprises selecting packets from unsynchronized sections of said plurality of synchronization buffers.

18. A non-transitory computer-readable medium having stored thereon a plurality of instructions, the plurality of instructions including instructions which, when executed by a processor, cause the processor to perform the steps of a method for providing seamless failover to a redundant stream at an edge device, comprising of:

receiving, via an IP (Internet Protocol) network, a plurality of video streams at a plurality of synchronization buffers, each of said plurality of video streams comprising a respective stream of MPEG packets, wherein the respective streams of MPEG packets are identical streams to each other at respective video stream sources, and wherein the respective streams of MPEG packets are received in non-identical packets of an IP layer of the IP network, each synchronization buffer receiving one of said plurality of video streams from a corresponding path of said plurality of paths;

synchronizing said plurality of video streams, wherein said synchronizing comprises achieving initial synchronization by determining packet offsets among the plurality of video streams; and generating a composite stream from said plurality of video streams according to a packet selection process, wherein the packet selection process is dependent upon the synchronizing step.

* * * * *